(12) United States Patent
Resch (10) Patent No.: US 10,534,661 B2
(45) Date of Patent: Jan. 14, 2020

(54) SELECTING A STORAGE ERROR ABATEMENT ALTERNATIVE IN A DISPERSED STORAGE NETWORK

(71) Applicant: International Business Machines Corporation, Armonk, NY (US)

(72) Inventor: Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 235 days.

(21) Appl. No.: 15/843,390

(22) Filed: Dec. 15, 2017

(65) Prior Publication Data

US 2018/0107544 A1 Apr. 19, 2018

Related U.S. Application Data

(63) Continuation-in-part of application No. 15/837,705, filed on Dec. 11, 2017, now Pat. No. 10,387,070, which is a continuation-in-part of application No. 15/006,735, filed on Jan. 26, 2016, now Pat. No. 10,079,887.

(60) Provisional application No. 62/140,861, filed on Mar. 31, 2015.

(51) Int. Cl.
*G06F 11/07* (2006.01)
*G06F 3/06* (2006.01)

(52) U.S. Cl.
CPC .......... *G06F 11/0793* (2013.01); *G06F 3/067* (2013.01); *G06F 3/0619* (2013.01); *G06F 11/0727* (2013.01)

(58) Field of Classification Search
CPC ............. G06F 11/0709; G06F 11/0727; G06F 11/793; G06F 11/079; G06F 11/1402; G06F 11/1415; G06F 11/2017; G06F 3/0614; G06F 3/0619
See application file for complete search history.

(56) References Cited

U.S. PATENT DOCUMENTS

| 4,092,732 A | 5/1978 | Duchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Gabriel Chu
(74) *Attorney, Agent, or Firm* — Garlick & Markison; Timothy W. Markison; Bruce E. Stuckman (57) ABSTRACT

A method for execution by an integrity processing unit includes detecting a storage error associated with storage of at least one encoded data slice in at least one memory of an associated storage unit of a set of storage units. Error parameters associated with the storage error are determined and a plurality of recovery alternatives to abate the storage error are identified based on the error parameters. A plurality of cost-benefit factors that correspond the plurality of recovery alternatives are determined. One of the plurality of recovery alternatives is selected based on the plurality of cost-benefit factors, and execution of the one of the plurality of recovery alternatives is facilitated to abate the storage error.

20 Claims, 6 Drawing Sheets

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,536,595 | B1 * | 5/2009 | Hiltunen ............. G06F 11/0709 |
| | | | 714/26 |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0034456 | A1 * | 2/2004 | Felke ................. G05B 23/0278 |
| | | | 701/32.9 |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2009/0292574 | A1 * | 11/2009 | Pop ........................ F22B 37/002 |
| | | | 705/7.37 |
| 2010/0023524 | A1 | 1/2010 | Gladwin et al. |
| 2012/0215398 | A1 * | 8/2012 | Chen ..................... G06Q 10/20 |
| | | | 701/31.6 |
| 2013/0198556 | A1 * | 8/2013 | Kolbet ................... G06Q 10/20 |
| | | | 714/2 |
| 2013/0305081 | A1 * | 11/2013 | Agnihotram ........ G06F 11/0793 |
| | | | 714/2 |
| 2015/0113324 | A1 * | 4/2015 | Factor ................... G06F 16/245 |
| | | | 714/20 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LPAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

SELECTING A STORAGE ERROR ABATEMENT ALTERNATIVE IN A DISPERSED STORAGE NETWORK

CROSS-REFERENCE TO RELATED APPLICATIONS

The present U.S. Utility patent application claims priority pursuant to 35 U.S.C. § 120 as a continuation-in-part of U.S. Utility application Ser. No. 15/837,705, entitled "ADDING INCREMENTAL STORAGE RESOURCES IN A DISPERSED STORAGE NETWORK", filed Dec. 11, 2017, which is a continuation-in-part of U.S. Utility application Ser. No. 15/006,735, entitled "MODIFYING STORAGE CAPACITY OF A SET OF STORAGE UNITS", filed Jan. 26, 2016, which claims priority pursuant to 35 U.S.C. § 119(e) to U.S. Provisional Application No. 62/140,861, entitled "MODIFYING STORAGE CAPACITY OF A STORAGE UNIT POOL", filed Mar. 31, 2015, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
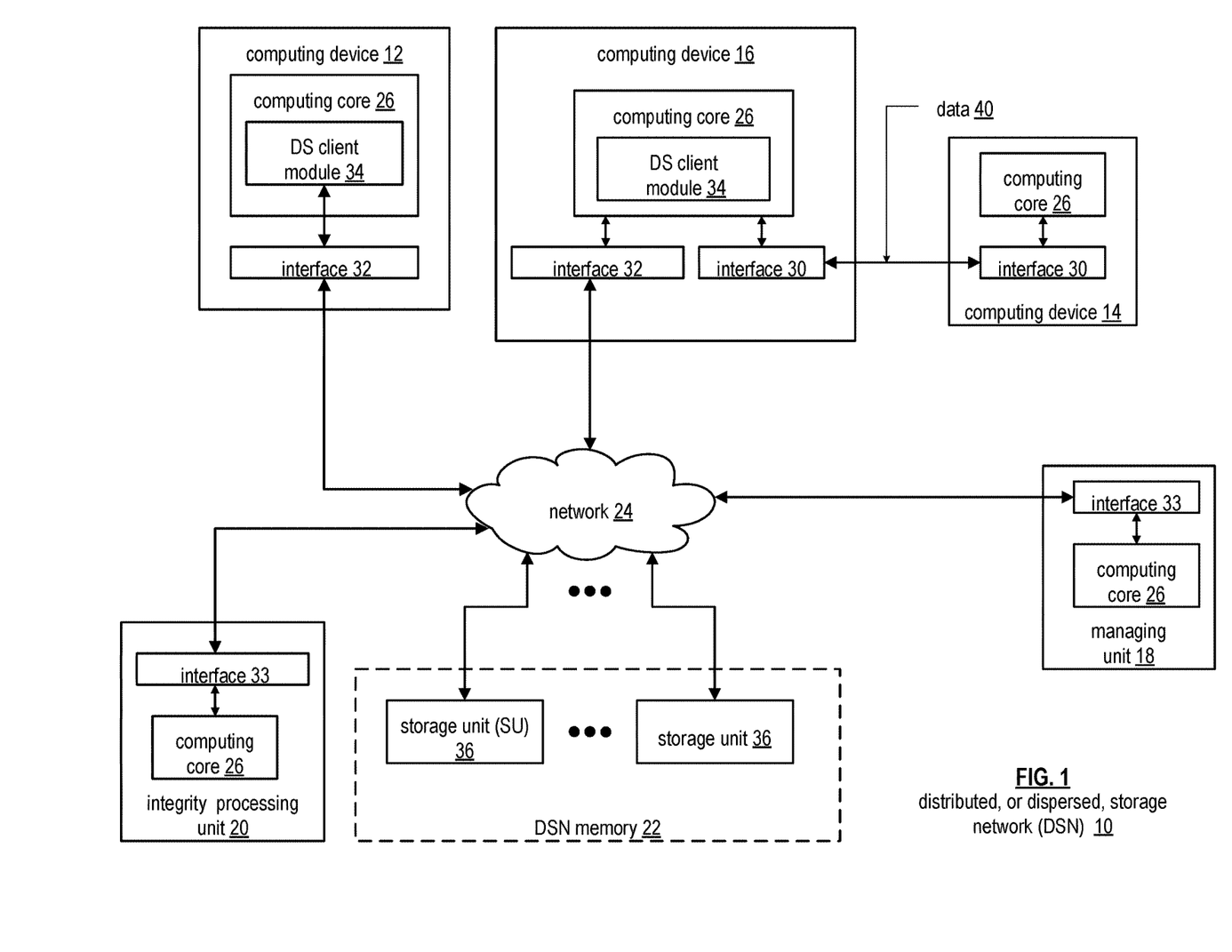
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
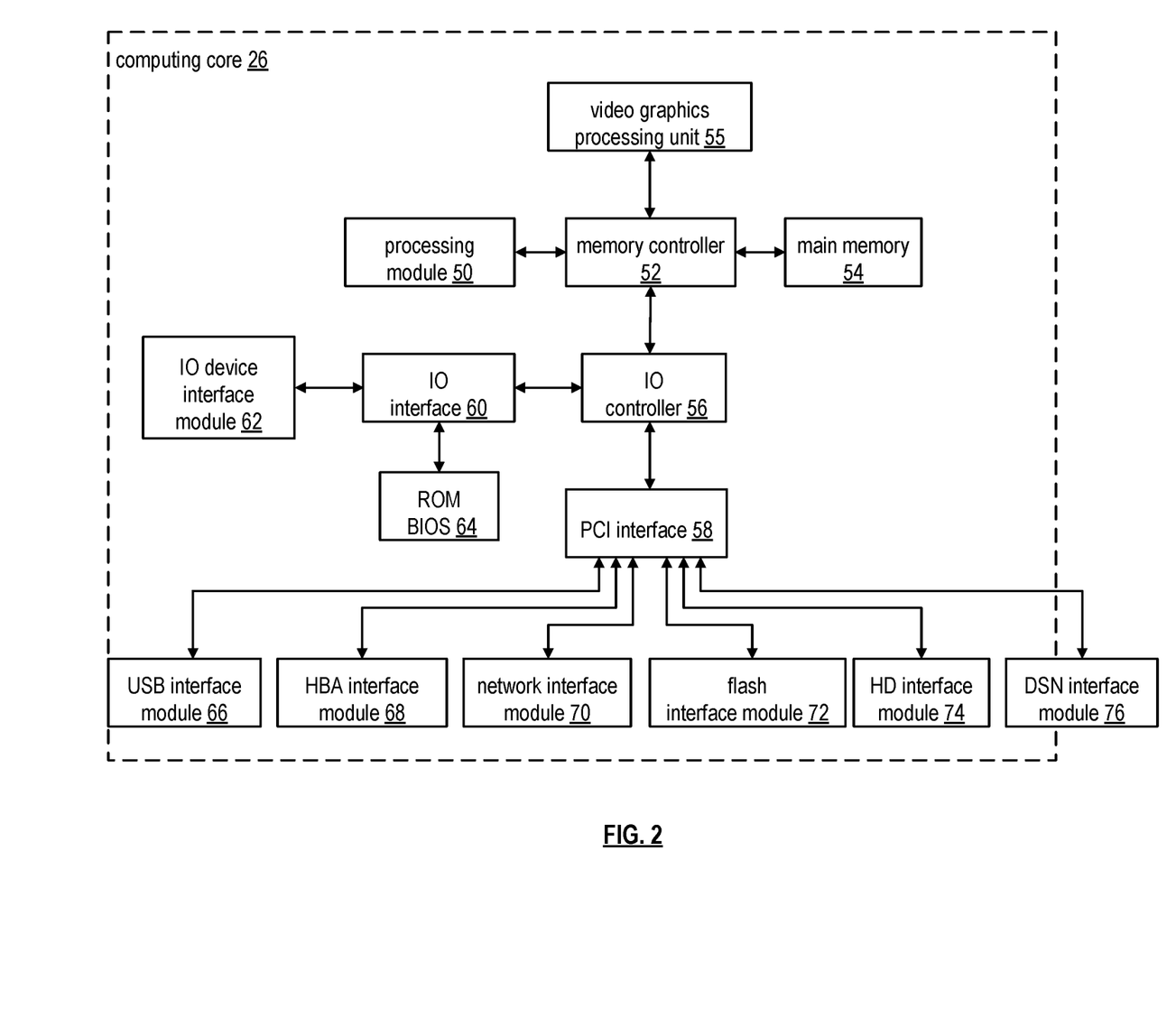
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
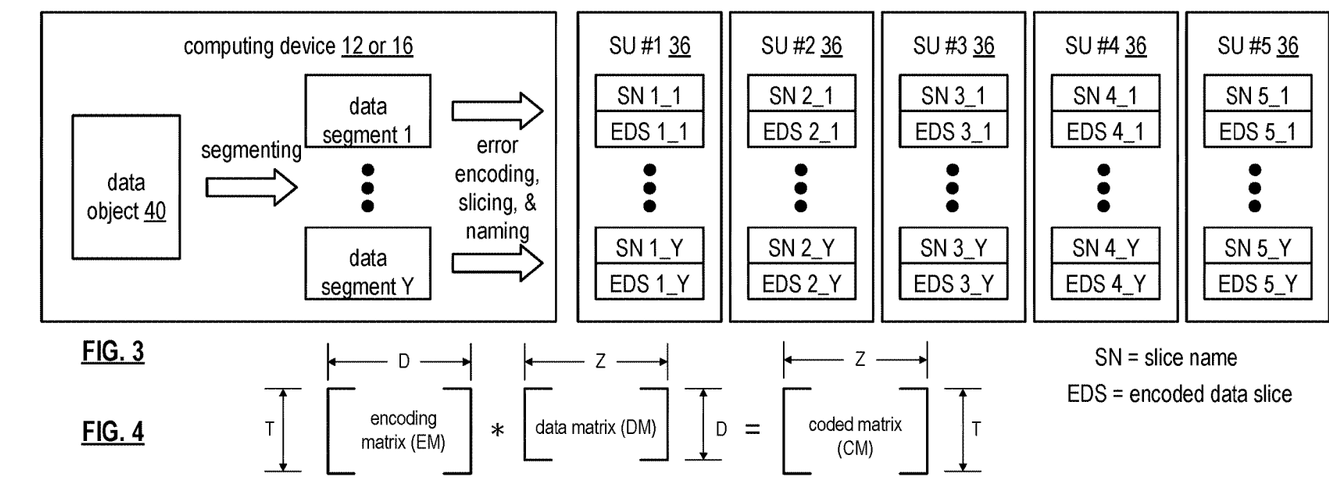
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
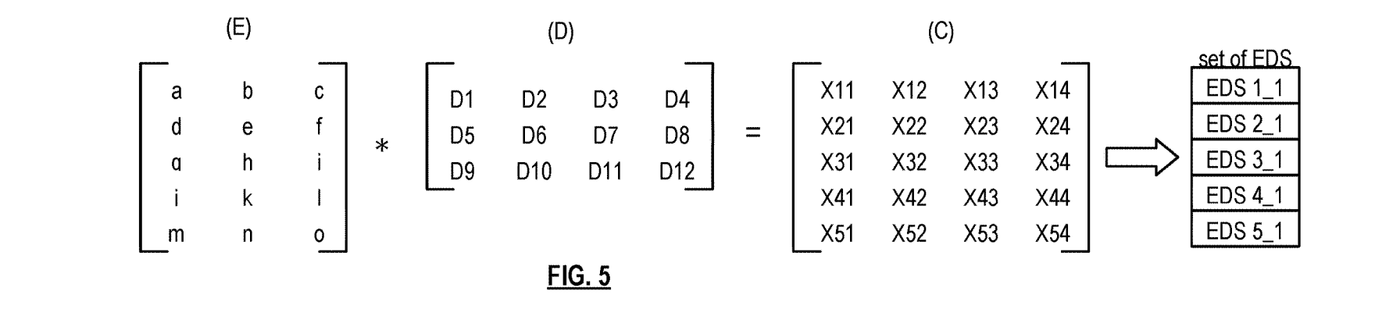
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
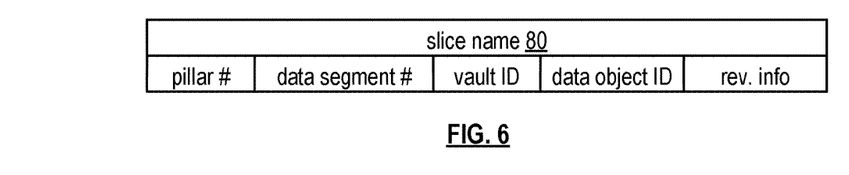
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
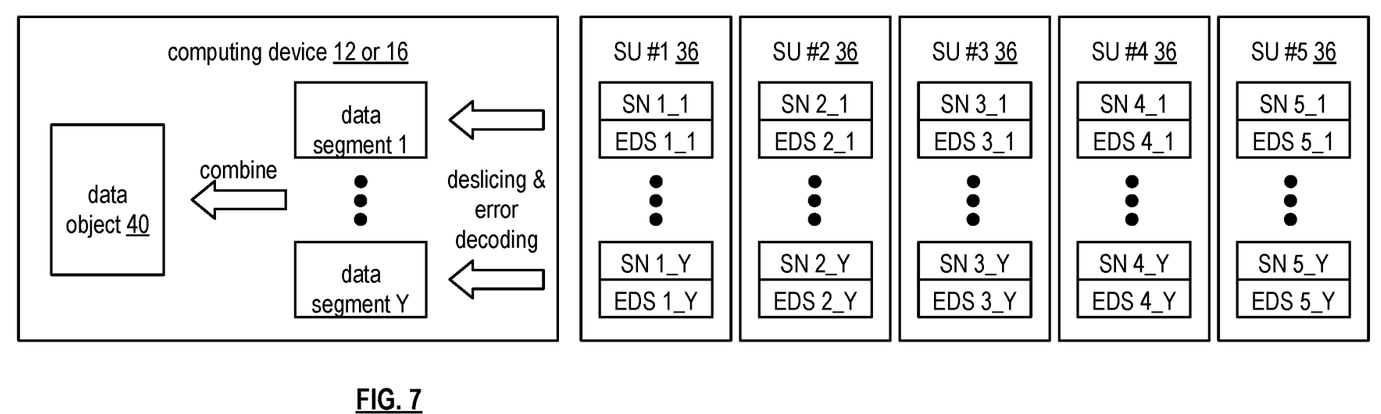
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
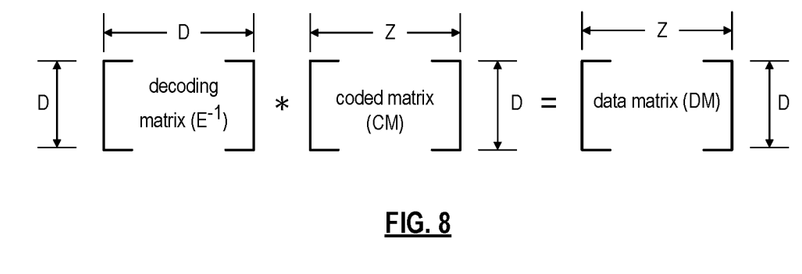
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
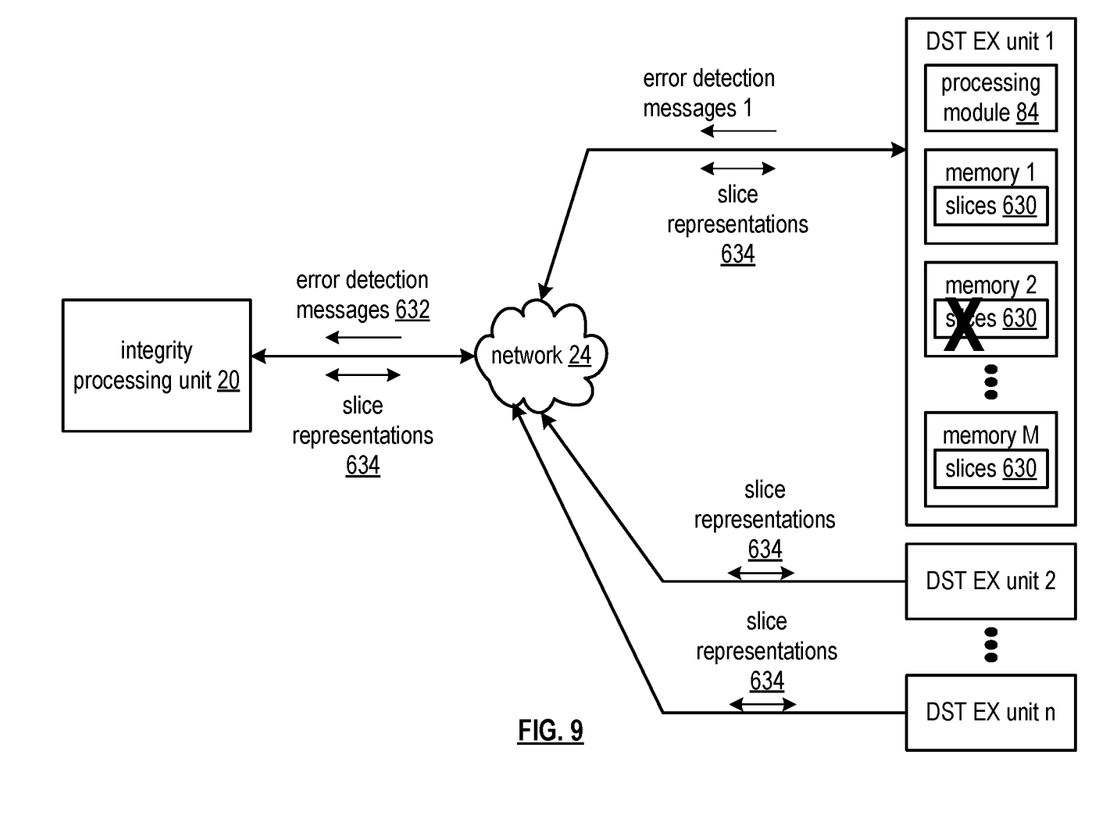
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes the integrity processing unit 20 of FIG. 1, the network 24 of FIG. 1, and a set of DST execution (EX) units 1-*n*. Each DST execution unit can include a processing module 84 and a plurality of memories 1-M. The processing module and/or the memories 1-M can be implemented by utilizing computing core 26 of FIG. 2. Each DST execution unit can be implemented utilizing the storage unit 36 of FIG. 1. The DSN functions to select a storage error abatement alternative when a storage error has been detected. The storage error can include at least one of a missing encoded data slice and/or a corrupted encoded data slice.

Within a storage unit, corruption can occur at any one of multiple layers, and at times multiple recovery operations exist. For example, within a storage unit, individual disk blocks on memory devices can be stored with error detection and correction information. Recovery at the disk block level can be executed with repeated attempts to re-read a given block and/or track of the storage media of the storage unit. This process can have a certain recovery time and/or success probability. At the file system level, corruption can be introduced by an unclean shutdown, and recovery of the file system integrity can be completed with a costly file system check process which can succeed in recovering a majority of the files. At an application level, slices can be stored in in-file data structures called "bin files" which can also undergo a recovery procedure that may result in the recovery of some fraction of the slices within them. Finally, at the DSN memory level, rebuilding can be performed to recover any slice (so long as it is above threshold) and this can have an associated network and computational cost as well. A process for determining the most efficient recovery method weighs which recovery options exist, what their cost is, and what their probability of success is to determine a most-direct (and least costly) approach to recovering the data. If failure occurs at the selected level, the next least costly approach can be taken, and so on. When all else fails, eventually the most costly recovery method can be exercised in a final attempt to recover the data. In the general case, however, data can be recovered by a least costly method, and most expensive recovery methods (such as sending a memory device to a specialized lab to be recovered) can be avoided due to recovery at higher levels, such as via rebuilding.

In an example of operation of the selecting of the storage error abatement alternative, at least one of the processing module 84 and/or the integrity processing unit 20 can detect a storage error associated with storage of one or more encoded data slices 630 in at least one memory of an associated DST execution unit. The detecting can include at least one of detecting a block error associated with a memory block of a particular memory (for example, indicating an error when recovered error detection information compares unfavorably to calculated error detection information of the memory block), detecting a file system error (e.g., a missing file that stores one or more encoded data slices, and/or a corrupted file that stores one or more encoded data slices), and/or a detecting a file system directory error. For example, the processing module 84 of the DST execution unit 1 detects a storage error associated with an encoded data slice stored in memory 2 of the DST execution unit 1 and issues error detection messages 1, via the network 24, to the integrity processing unit 20.

Having detected the storage error, the integrity processing unit 20 can determine error parameters associated with the storage error extracted from error detection messages 632. The error parameters can include an error type (e.g., slice corruption missing slice, file system error, then file error where multiple slices are stored in one file), a location of the storage error (e.g., memory device identifier, block identifier, sector identifier, track identifier, storage cell identifier), a number of the associated storage errors, and/or a history of previous storage errors associated with one or more of the error type and the location of the storage error. The determining can be based on one or more of detecting the storage error, interpreting system registry information, and/or interpreting DST execution unit configuration information.

Having determined the error parameters, the integrity processing unit 20 can identify a plurality of recovery alternatives to abate the storage error based on the error parameters. The identifying can include at least one of interpreting a recovery alternative list based on the error parameters and/or accessing a historical record of successful storage error abatement alternatives based on previous error parameters. The recovery alternatives can include at least one of rereading a data block, error correcting a data block, repairing a portion of the file system, recovering a bin file that includes a plurality of encoded data slices, and/or obtaining a decode threshold number of slice representations 634 of a set of encoded data slices to rebuild an encoded data slice associated with the storage error.

For each identified recovery alternative, the integrity processing unit 20 can determine a cost benefit factor based on one or more of required resources, record timing, require network bandwidth, resulting downtime, estimated recovery effectiveness, estimated data loss, a historical record of recovery resource utilization, and/or recovery alternative results (e.g., assign a more favorable cost benefit factor to a recovery alternative associated with more favorable historical outcome while utilizing a favorable level of resources). Having determined the cost-benefit factors, the integrity processing unit 20 can select a recovery alternative based on the plurality of cost-benefit factors of the plurality of recovery alternatives. The selecting can include at least one of rank ordering the recovery alternatives based on the cost benefit factors, identifying a recovery alternative associated with a most favorable outcome while utilizing a most favorable level of resources as a first choice recovery alternative, and/or identifying a subsequent second choice, etc., in accordance with the ranked ordering of the recovery alternatives.

Having selected the recovery alternative, the integrity processing unit 20 can facilitate execution of abatement of the storage error utilizing the selected recovery alternative. For example, the integrity processing unit 20 performs a selected recovery alternative, measures results, saves the results and a historical record, and/or selects a next most favorable recovery alternative when a level of abatement of the storage error has not been reached. As a specific example, the integrity processing unit 20 recovers a decode threshold number of slice representations 634 from other DST execution units, dispersed storage error decodes the decode threshold number of slice or presentations to recovery data segment, dispersed storage error encodes the recovered data segment to produce a rebuilt encoded data slice, and sends, via the network 24, the rebuilt encoded data slice as a slice representation to the DST education unit 1, where the processing module 84 of the DST execution unit 1 stores the rebuilt encoded data slice in the memory 2.

In various embodiments, a processing system of an integrity processing unit includes at least one processor and a memory that stores operational instructions, that when executed by the at least one processor cause the processing system to detect a storage error associated with storage of at least one encoded data slice in at least one memory of an associated storage unit of a set of storage units. Error parameters associated with the storage error are determined and a plurality of recovery alternatives to abate the storage error are identified based on the error parameters. A plurality of cost-benefit factors that correspond the plurality of recovery alternatives are determined. One of the plurality of recovery alternatives is selected based on the plurality of cost-benefit factors, and execution of the one of the plurality of recovery alternatives is facilitated to abate the storage error.

In various embodiments, a set of encoded data slices that includes the at least one encoded data slice is associated with a data segment, where the data segment was dispersed storage error encoded to produce the set of encoded data slices for storage in the set of storage units. In various embodiments, the at least one encoded data slice is missing or corrupted. In various embodiments, detecting the storage error includes scanning for a block error, receiving a file system error message, and/or identifying a bin file associated the at least one encoded data slice.

In various embodiments, identify the plurality of recovery alternatives includes interpreting a recovery alternative list based on the error parameters. In various embodiments, determining the each of the plurality of cost-benefit factors is based on maximum network bandwidth utilization and maximum required downtime. In various embodiments, determining the each of the plurality of cost-benefit factors is based on estimated recovery effectiveness, estimated data loss, and an estimated resource utilization level. In various embodiments, selecting the one of the plurality of recovery alternatives includes ranking the plurality of recovery alternatives based on the plurality of cost-benefit factors and selecting a most favorably ranked recovery alternative.

In various embodiments, facilitating execution of the one of the plurality of recovery alternatives includes executing the one of the plurality of recovery alternatives. An effectiveness of executing the one of the plurality of recovery alternatives is measured and a next most favorable recovery alternative is selected for execution when the measured effectiveness indicates that a level of abatement of the storage error has not been reached. In various embodiments, facilitating execution of the one of the plurality of recovery alternatives further includes measuring a resource utilization level of executing the one of the plurality of recovery alternatives. The measured effectiveness and the measured resource utilization level are saved in a historical record. Determining the plurality of cost-benefit factors is based on at least one previously measured effectiveness and at least one previously measured resource utilization level of at least one previous execution of at least one of the plurality of recovery alternatives, retrieved by the integrity processing unit from the historical record.

Figure 10:
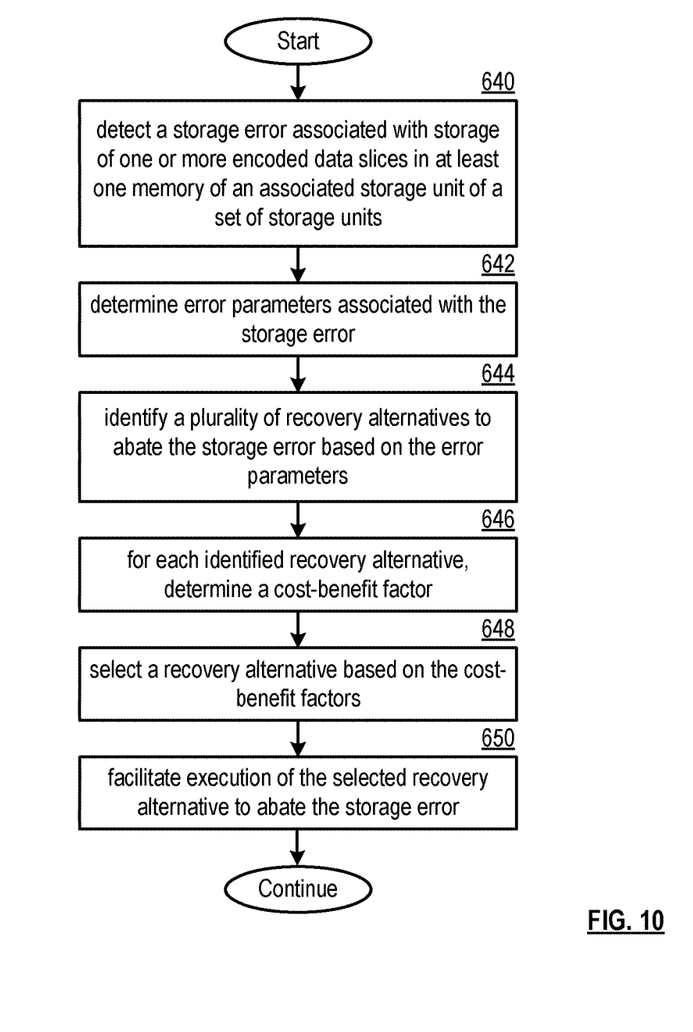
FIG. 10 is a logic diagram of an example of a method of selecting a storage error abatement alternative in accordance with the present invention.

FIG. 10 is a flowchart illustrating an example of selecting a storage error abatement alternative. In particular, a method is presented for use in association with one or more functions and features described in conjunction with FIGS. 1-9, for execution by an integrity processing unit that includes a processor or via another processing system of a dispersed storage network that includes at least one processor and memory that stores instruction that configure the processor or processors to perform the steps described below.

The method includes step 640 where a processing system (e.g., of a distributed storage and task (DST) execution unit and/or of an integrity processing unit) detects a storage error associated with storage of one or more encoded data slices in at least one memory of an associated storage unit of a set of storage units. The detecting can include at least one of scanning for a block error, receiving a file system error message, and/or identifying a bin file associated with at least one missing or corrupted encoded data slice.

The method continues at step 642 where the processing system determines error parameters associated with the storage error. The determining can include at least one of collecting the error parameters from the detection process, interpreting system registry information, and/or interpreting storage unit configuration information. The method continues at step 644 where the processing system identifies a plurality of recovery alternatives to abate the storage error based on the error parameters. The identifying can include at least one of interpreting a recovery alternative list based on the error parameters and/or accessing a historical record.

For each identified recovery alternative, the method continues at step 646 where the processing system determines a cost benefit factor. The determining may be based on one or more of required resources, record timing, record maximum network bandwidth utilization, required maximum downtime, estimated recovery effectiveness, estimated data loss, estimated resource utilization level, and/or an estimated effectiveness level. The determining can be based on the historical record, for example, by utilizing previously measured metrics of previous execution of some or all of the identified recovery alternatives.

The method continues at step 648 where the processing system selects a recovery alternative based on the cost-benefit factors. For example, the processing system rank orders the identified recovery alternatives based on the cost-benefit factors and identifies a most favorably ranked recovery alternative as the selected recovery alternative.

The method continues at step 650 where the processing system facilitates execution of the selected recovery alternative to abate the storage error. For example, the processing system performs a selected recovery alternative, measures effectiveness and/or resource utilization levels, saves the results in the historical record or another memory, and/or selects a next most favorable recovery alternative when a level of abatement of the storage error has not been reached.

In various embodiments, a non-transitory computer readable storage medium includes at least one memory section that stores operational instructions that, when executed by a processing system of a dispersed storage network (DSN) that includes a processor and a memory, causes the processing system to detect a storage error associated with storage of at least one encoded data slice in at least one memory of an associated storage unit of a set of storage units. Error parameters associated with the storage error are determined and a plurality of recovery alternatives to abate the storage error are identified based on the error parameters. A plurality of cost-benefit factors that correspond the plurality of recovery alternatives are determined. One of the plurality of recovery alternatives is selected based on the plurality of cost-benefit factors, and execution of the one of the plurality of recovery alternatives is facilitated to abate the storage error.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an integrity processing unit that includes a processor, the method comprises:
   detecting a storage error associated with storage of at least one encoded data slice in at least one memory of an associated storage unit of a set of storage units;
   determining error parameters associated with the storage error;
   identifying a plurality of recovery alternatives to abate the storage error based on the error parameters;
   determining a plurality of cost-benefit factors that correspond to the plurality of recovery alternatives;
   selecting one of the plurality of recovery alternatives based on the plurality of cost-benefit factors; and
   facilitating execution of the one of the plurality of recovery alternatives to abate the storage error.

2. The method of claim 1, wherein a set of encoded data slices that includes the at least one encoded data slice is associated with a data segment, and wherein the data segment was dispersed storage error encoded to produce the set of encoded data slices for storage in the set of storage units.

3. The method of claim 1, wherein the at least one encoded data slice is one of: missing or corrupted.

4. The method of claim 1, wherein detecting the storage error includes at least one of: scanning for a block error, receiving a file system error message, or identifying a bin file associated with the at least one encoded data slice.

5. The method of claim 1, wherein identifying the plurality of recovery alternatives includes interpreting a recovery alternative list based on the error parameters.

6. The method of claim 1, wherein determining the each of the plurality of cost-benefit factors is based on maximum network bandwidth utilization and maximum required downtime.

7. The method of claim 1, wherein determining the each of the plurality of cost-benefit factors is based on estimated recovery effectiveness, estimated data loss, and an estimated resource utilization level.

8. The method of claim 1, wherein selecting the one of the plurality of recovery alternatives includes ranking the plurality of recovery alternatives based on the plurality of cost-benefit factors and selecting a most favorably ranked recovery alternative.

9. The method of claim 1, wherein facilitating execution of the one of the plurality of recovery alternatives includes:
   executing the one of the plurality of recovery alternatives;
   measuring an effectiveness of executing the one of the plurality of recovery alternatives; and
   selecting a next most favorable recovery alternative for execution when the measured effectiveness indicates that a level of abatement of the storage error has not been reached.

10. The method of claim 9, wherein facilitating execution of the one of the plurality of recovery alternatives further includes:
    measuring a resource utilization level of executing the one of the plurality of recovery alternatives; and
    saving the measured effectiveness and the measured resource utilization level in a historical record;
    wherein determining the plurality of cost-benefit factors is based on at least one previously measured effectiveness and at least one previously measured resource utilization level of at least one previous execution of at least one of the plurality of recovery alternatives, wherein the at least one previously measured effectiveness and the at least one previously measured resource utilization level are retrieved from the historical record.

11. A processing system of an integrity processing unit comprises:
    at least one processor;
    a memory that stores operational instructions, that when executed by the at least one processor cause the processing system to:
      detect a storage error associated with storage of at least one encoded data slice in at least one memory of an associated storage unit of a set of storage units;
      determine error parameters associated with the storage error;
      identify a plurality of recovery alternatives to abate the storage error based on the error parameters;
      determine a plurality of cost-benefit factors that correspond to the plurality of recovery alternatives;
      select one of the plurality of recovery alternatives based on the plurality of cost-benefit factors; and
      facilitate execution of the one of the plurality of recovery alternatives to abate the storage error.

12. The processing system of claim 11, wherein a set of encoded data slices that includes the at least one encoded data slice is associated with a data segment, and wherein the data segment was dispersed storage error encoded to produce the set of encoded data slices for storage in the set of storage units.

13. The processing system of claim 11, wherein the at least one encoded data slice is one of: missing or corrupted.

14. The processing system of claim 11, wherein detecting the storage error includes at least one of: scanning for a block error, receiving a file system error message, or identifying a bin file associated with the at least one encoded data slice.

15. The processing system of claim 11, wherein determining the each of the plurality of cost-benefit factors is based on maximum network bandwidth utilization and maximum required downtime.

16. The processing system of claim 11, wherein determining the each of the plurality of cost-benefit factors is based on estimated recovery effectiveness, estimated data loss, and an estimated resource utilization level.

17. The processing system of claim 11, wherein selecting the one of the plurality of recovery alternatives includes ranking the plurality of recovery alternatives based on the plurality of cost-benefit factors and selecting a most favorably ranked recovery alternative.

18. The processing system of claim 11, wherein facilitating execution of the one of the plurality of recovery alternatives includes:
   executing the one of the plurality of recovery alternatives;
   measuring an effectiveness of executing the one of the plurality of recovery alternatives; and
   selecting a next most favorable recovery alternative for execution when the measured effectiveness indicates that a level of abatement of the storage error has not been reached.

19. The processing system of claim 18, wherein facilitating execution of the one of the plurality of recovery alternatives further includes:
   measuring a resource utilization level of executing the one of the plurality of recovery alternatives; and
   saving the measured effectiveness and the measured resource utilization level in a historical record;
   wherein determining the plurality of cost-benefit factors is based on at least one previously measured effectiveness and at least one previously measured resource utilization level of at least one previous execution of at least one of the plurality of recovery alternatives, wherein the at least one previously measured effectiveness and the at least one previously measured resource utilization level are retrieved from the historical record.

20. A non-transitory computer readable storage medium comprises:
   at least one memory section that stores operational instructions that, when executed by a processing system of a dispersed storage network (DSN) that includes a processor and a memory, causes the processing system to:
   detect a storage error associated with storage of at least one encoded data slice in at least one memory of an associated storage unit of a set of storage units;
   determine error parameters associated with the storage error;
   identify a plurality of recovery alternatives to abate the storage error based on the error parameters;
   determine a plurality of cost-benefit factors that correspond to the plurality of recovery alternatives;
   select one of the plurality of recovery alternatives based on the plurality of cost-benefit factors; and
   facilitate execution of the one of the plurality of recovery alternatives to abate the storage error.

* * * * *